United States Patent
Hallstrom et al.

(10) Patent No.: US 8,045,763 B2
(45) Date of Patent: Oct. 25, 2011

(54) METHOD AND APPARATUS FOR RECOGNIZING AND DETERMINING THE POSITION OF AT LEAST ONE TEAT CUP

(75) Inventors: Anders Hallstrom, Handen (SE); Thomas Axelsson, Farsta (SE)

(73) Assignee: DeLaval Holding AB, Tumba (SE)

( * ) Notice: Subject to any disclaimer, the term of this patent is extended or adjusted under 35 U.S.C. 154(b) by 440 days.

(21) Appl. No.: 12/303,418

(22) PCT Filed: Jul. 12, 2007

(86) PCT No.: PCT/SE2007/050523
§ 371 (c)(1),
(2), (4) Date: Dec. 4, 2008

(87) PCT Pub. No.: WO2008/008036
PCT Pub. Date: Jan. 17, 2008

(65) Prior Publication Data
US 2010/0278374 A1    Nov. 4, 2010

(30) Foreign Application Priority Data

Jul. 13, 2006 (SE) .................................... 0601556

(51) Int. Cl.
*G06K 9/20* (2006.01)
(52) U.S. Cl. .................................... 382/110; 119/14.08
(58) Field of Classification Search .................. 382/110; 119/14.01, 14.03, 14.08; 356/614
See application file for complete search history.

(56) References Cited

U.S. PATENT DOCUMENTS

| 6,532,892 B1* | 3/2003 | Nilsson ................... 119/14.03 |
| 7,255,063 B2* | 8/2007 | Van Den Berg et al. ... 119/14.03 |
| 7,299,766 B2* | 11/2007 | Van Den Berg et al. ... 119/14.02 |
| 2005/0005861 A1* | 1/2005 | Van Den Berg et al. ... 119/14.02 |

FOREIGN PATENT DOCUMENTS

| WO | 9715900 | 5/1997 |
| WO | 9715901 | 5/1997 |
| WO | 9845808 | 10/1998 |
| WO | 0062602 | 10/2000 |
| WO | 2005094565 | 10/2005 |

OTHER PUBLICATIONS

International Search Report dated Nov. 20, 2007, in PCT application.

* cited by examiner

*Primary Examiner* — Kara E Geisel
(74) *Attorney, Agent, or Firm* — Young & Thompson

(57) ABSTRACT

An apparatus (10) for recognizing and determining the position of at least one teat cup ($40_1$, $40_2$, $40_3$, $40_4$) of at least one teat cup magazine (42, $42_1$, $42_2$). The apparatus (10) emits waves (20) into a region (A) which is expected to contain a teat cup or teat cups ($40_1$, $40_2$, $40_3$, $40_4$). The apparatus (10) also includes a detector (260) for detecting reflections of the waves (20). The apparatus (10) also includes a unit (24) for evaluating the reflections in order to determine if the reflections originate from the teat cup or cups ($40_1$, $40_2$, $40_3$, $40_4$). Furthermore, the apparatus (10) also includes a unit (26) for determining the position of the teat cup or cups ($40_1$, $40_2$, $40_3$, $40_4$) if it is established that the reflections originate from the teat cup ($40_1$, $40_2$, $40_3$, $40_4$).

29 Claims, 7 Drawing Sheets

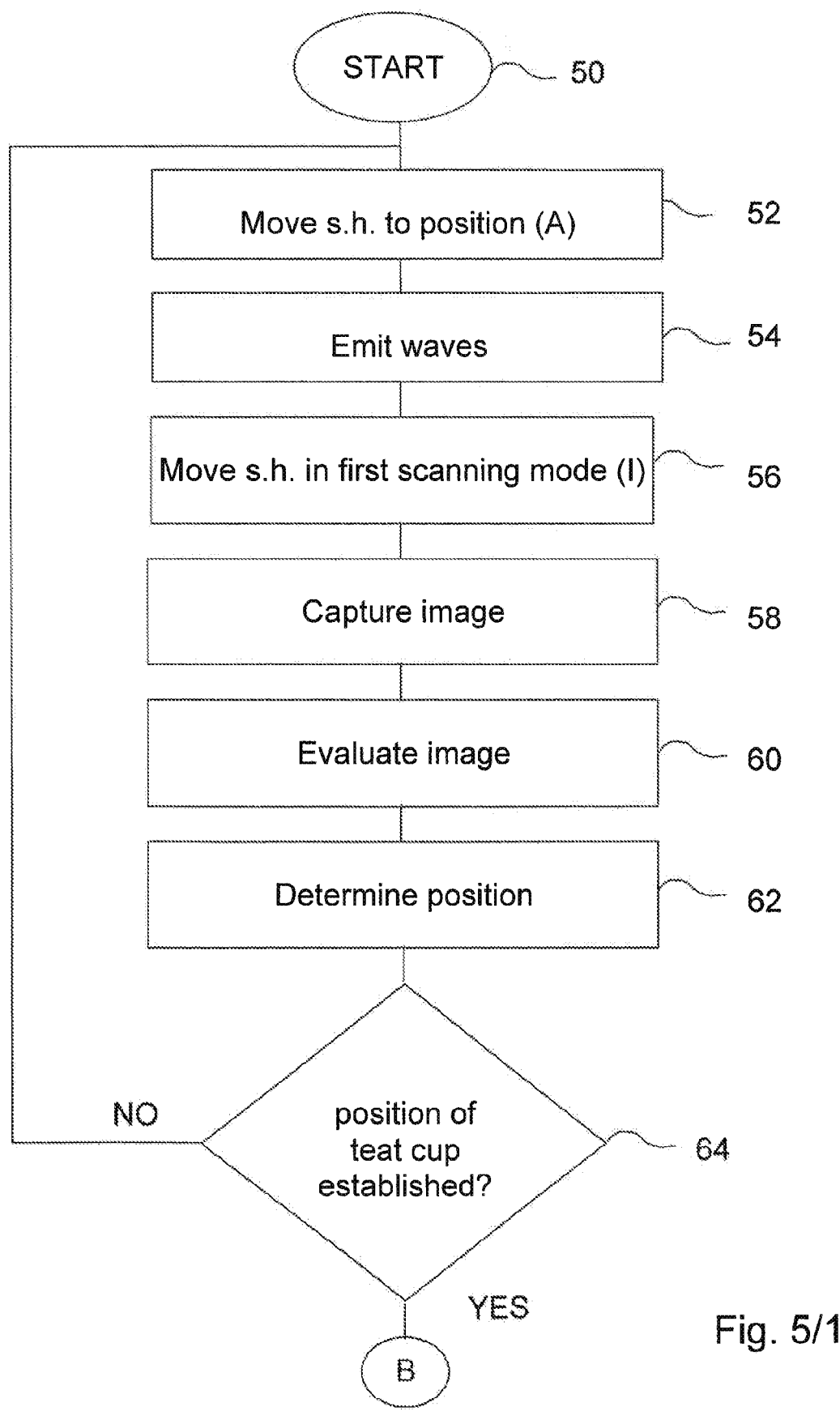
Fig. 5/1

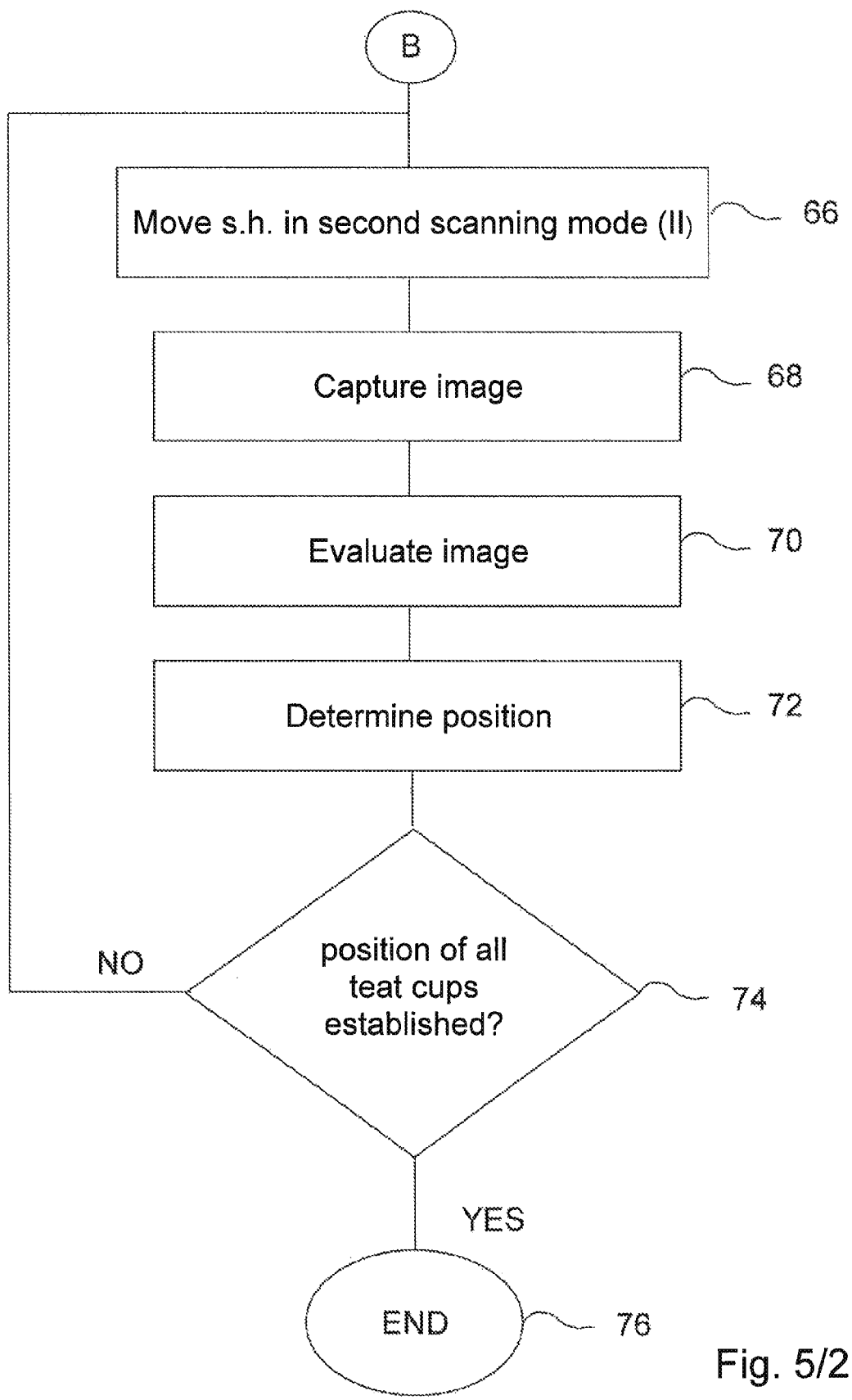
Fig. 5/2

METHOD AND APPARATUS FOR RECOGNIZING AND DETERMINING THE POSITION OF AT LEAST ONE TEAT CUP

FIELD OF THE INVENTION

The present invention relates, in a first aspect, to a method for recognising and determining the position of at least one teat cup of at least one teat cup magazine.

According to a second aspect, the present invention relates to an apparatus for recognising and determining the position of at least one teat of at least one teat cup magazine.

According to a third aspect, the present invention relates to at least one computer program product for recognising and determining the position of at least one teat cup of at least one teat cup magazine.

BACKGROUND OF THE INVENTION

A lot of the steps making up the milking procedure are fully automatic, but not all of them. One of these steps which are not fully automatic, is when the teat cups, e.g. with the aid of a robot arm, are to be fetched from a teat cup magazine. This step needs the attendance by an operator and/or the use of so called historical data about the teat cup magazines.

SUMMARY OF THE INVENTION

The above mentioned problems are solved by a method for recognizing and determining the position of at least one teat cup of at least one teat cup magazine by a method comprising steps:
 to emit waves into a region containing said at least one teat cup so as to direct said waves towards said at least one teat cup;
 to detect reflections of said waves;
 to evaluate said reflections so as to determine if said reflections originate from said at least one teat cup: and
 in the event that it is established that said reflections originate from said at least one teat cup, to determine the position of said at least one teat cup.

A first main advantage with the method according to the present invention is that it is "self learning", i.e. it is not dependent on so called historical data about the teat cup magazines. Another advantage with the method according to the present invention is that it is fully automatic, i.e. it does not need the attendance by an operator.

A further advantage with the method according to the present invention, especially if it is applied in a milking parlour, is that a lot of time is saved. A common size of a milking parlour is e.g. 20-80 milking locations.

A further advantage in this context is achieved if said method also comprises the steps:
 to emit waves directed towards a known reference point with a known position, and
 to make use of said known position when determining the position of said at least one teat cup. Hereby, the method gets more accurate and/or faster.

Furthermore, it is an advantage in this context if said teat cup magazine comprises a first and a second teat cup magazine, and if said emitting step comprises to emit said waves directed towards said first magazine and said second magazine. Hereby, the method is adapted to the use of two, differently placed teat cup magazines, instead of only one teat cup magazine at a milking location.

A further advantage in this context is achieved if said emitting step is performed with the aid of a wave emitting source comprised in a movable scanning head. Hereby, the method will be even more useful.

Furthermore, it is an advantage in this context if the method also comprises the steps:
 with the aid of an identification means located at each milking location, to identify each milking location; and
 to store said established position of said at least one teat cup, and to relate it to said identification means. Hereby, the method gets more adapted to the use of many different milking locations. Hereby, the method will not be influenced by the fact that the fetch position of the teat cups variates in relation to the position of the robot arm between different milking locations, due to geometrical tolerances and accumulated errors due to long measuring chains.

The invention also relates to an apparatus for recognizing and determining the position of at least one teat cup of at least one teat cup magazine.

The advantages of the apparatus according to the present invention are the same as those mentioned in connection to the method according to the present invention.

The invention also relates to at least one computer program product. The computer program product is directly loadable into the internal memory of at least one digital computer. The computer program product comprises software code portions for performing the steps of the method according to the present invention when the product is run on said computer.

A first main advantage with the computer program product according to the present invention is that it is "self learning", i.e. it is not dependent on so called historical data about the teat cup magazines. Another advantage with the computer program product according to the present inventions that it is fully automatic, i.e. it does not need the attendance of an operator.

A further advantage with the computer program product according to the present invention, especially if it is applied in a milking parlour with several milking locations, is that a lot of time is saved. A common size of a milking parlour is e.g. 20-80 milking locations.

It will be noted that the term "comprises/comprising" as used in this description is intended to denote the presence of a given characteristic, step or component, without excluding the presence of one or more other characteristic, features, integers, steps, components or groups thereof.

Embodiments of the invention will now be described with a reference to the accompanying drawings, in which:

BRIEF DESCRIPTION OF THE DRAWINGS

FIG. 5 is a flow chart of a second embodiment of the method for recognising and determining the position of at least one teat cup of a teat cup magazine according to the present invention.

DETAILED DESCRIPTION OF PREFERRED EMBODIMENTS

Figure 1:
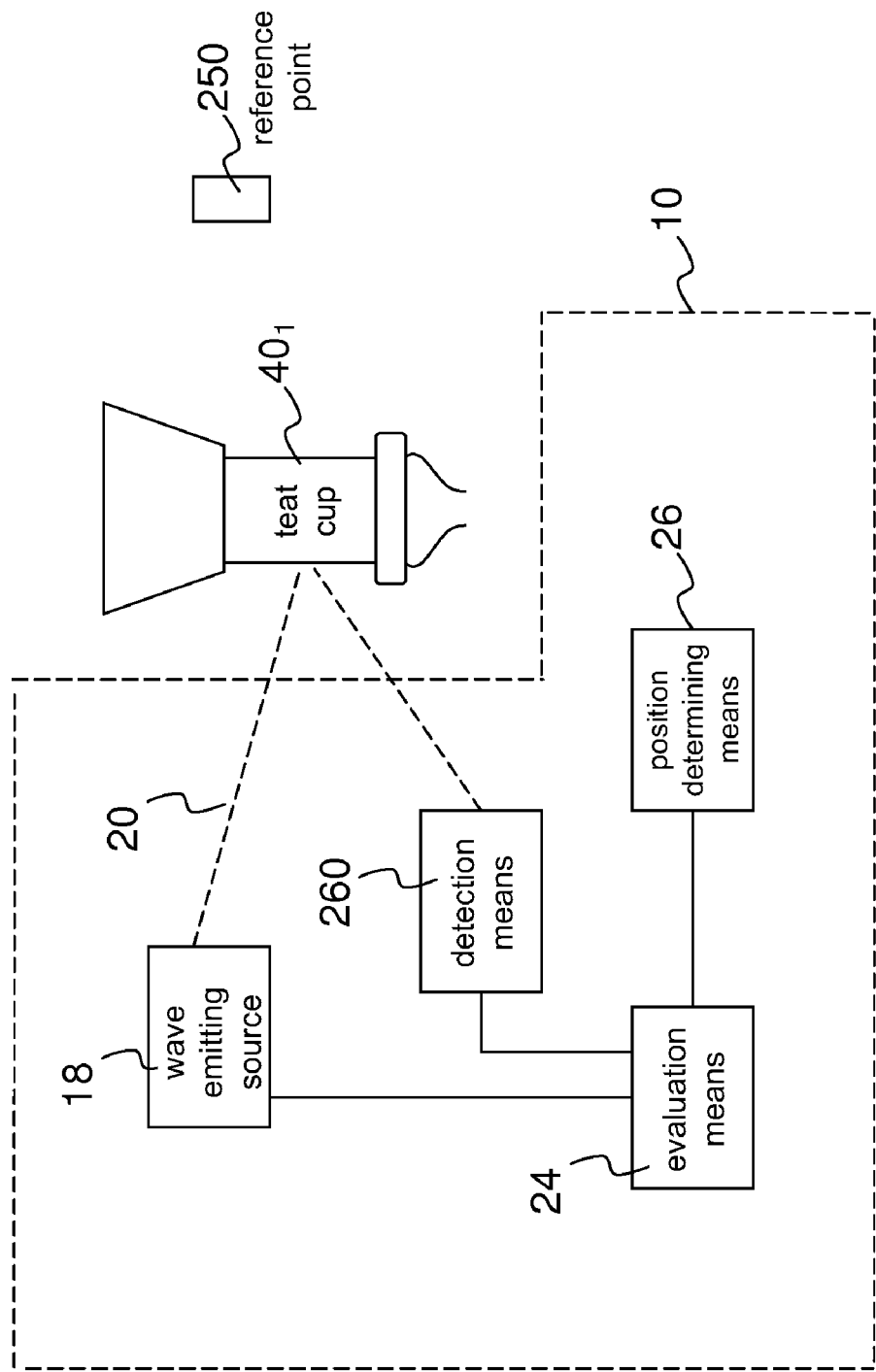
FIG. 1 shows a block diagram of a first embodiment of an apparatus for recognising and determining the position of at least one teat cup of a teat cup magazine according to the present invention.
Figure 3A:
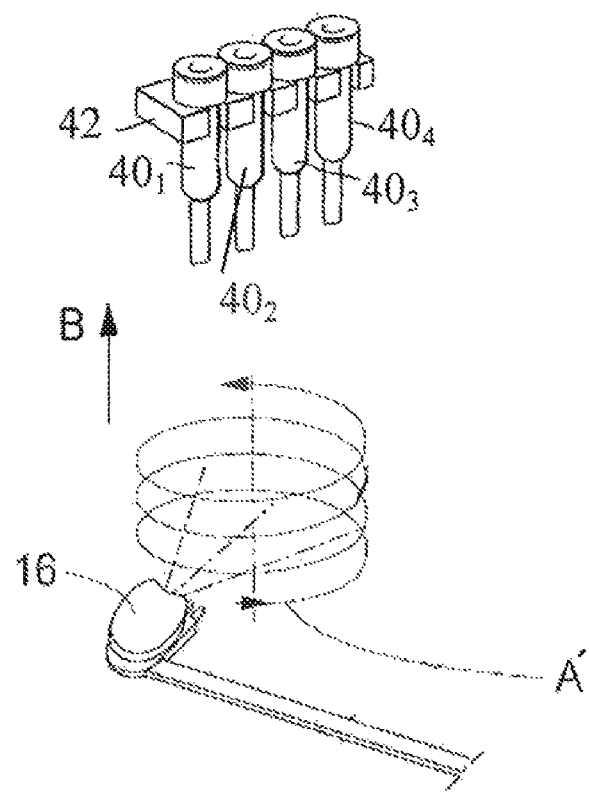
FIGS. 3a and 3b diagrammatically shows the movement of the scanning head, under a teat cup magazine, in the second embodiment of the apparatus according to the present invention.

In FIG. 1 there is disclosed a block diagram of a first embodiment of an apparatus 10 for recognising and determining the position of at least one teat cup $40_1$, $40_2$, $40_3$, $40_4$ of at least one teat cup magazine 42 according to the present invention. As is apparent in FIG. 1, the apparatus 10 comprises a wave emitting source 18 which is operable to emit waves 20 into a region (A') (see FIG. 3a) which is expected to contain said at least one teat cup $40_1$, $40_2$, $40_3$, $40_4$. The apparatus 10 also comprises a detection means 260 operable to detect reflections of said waves 20. Furthermore, the apparatus 10 also comprises a means 24, connected to the detection means 260, operable to evaluate said reflections so as to determine if said reflections originate from the at least one teat cup $40_1$, $40_2$, $40_3$, $40_4$, Furthermore, the apparatus 10 also comprises a means 26 connected to the evaluating means 24. The means 26 is operable to determine the position of the at least one teat cup $40_1$, $40_2$, $40_3$, $40_4$ if it is established that the reflections originate from the teat cup $40_1$, $40_2$, $40_3$, $40_4$. The wave emitting source 18 is also operable to emit waves 20 directed towards a known reference point 250 (only disclosed schematically) with a known position, and the means 26 is also operable to make use of the known position when determining the position of the at least one teat cup $40_1$, $40_2$, $40_3$, $40_4$.

It is possible to have a teat cup magazine 42 intended for a milking location, wherein the teat cup magazine 42 is divided into a first teat cup magazine and a second teat cup magazine, e.g. arranged on opposite sides of the milking location. In this embodiment, the wave emitting source 18 is operable to emit waves 20 directed towards the first and second magazines.

Figure 2:
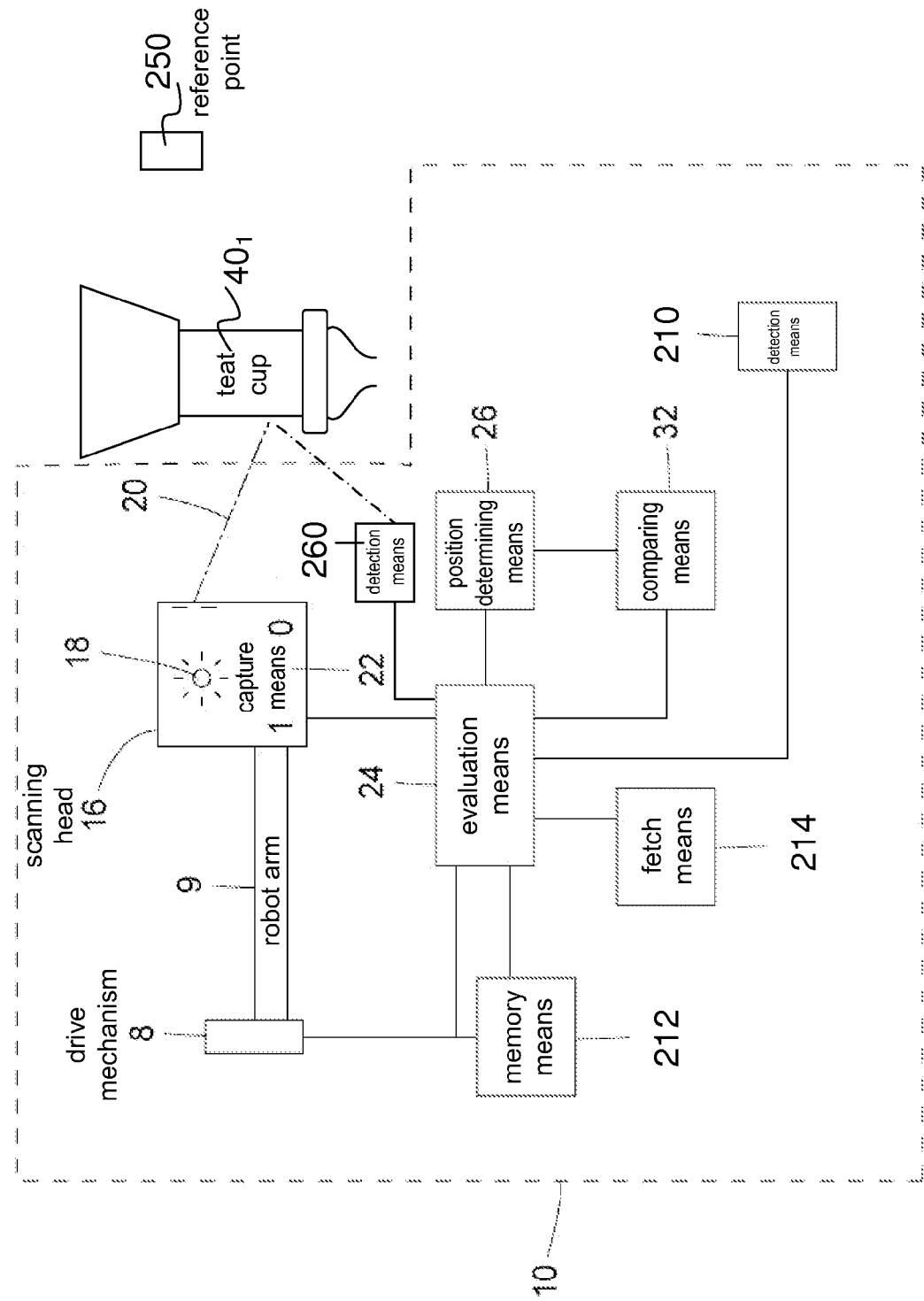
FIG. 2 shows a block diagram of a second embodiment of an apparatus for recognising and determining the position of at least one teat cup of a teat cup magazine according to the present invention.

In FIG. 2 there is disclosed a block diagram of a second embodiment of an apparatus 10 for recognising and determining the position of at least one teat cup $40_1$, $40_2$, $40_3$, $40_4$ of a teat cup magazine 42. As is apparent in FIG. 2, the apparatus 10 comprises a scanning head 16 comprising a light source 18, such as a laser is source 18, being arranged to emit a sheet shaped bundle of light 20 into a region which is expected to contain at least one teat cup $40_1$, $40_2$, $40_3$, $40_4$ of a teat cup magazine 42. For the sake of simplicity, only one teat cup $40_1$ is disclosed in FIG. 2. The bundle of light 20 is directed substantially horizontally. Inside the scanning head 16 there is also provided a means 22 operable to capture at least one image formed by the light 20.

The means 22 is e.g. an image-capturing camera 22, for example a charge coupled device camera 22 (CCD-camera) or a CMOS-camera. The image-capturing camera 22 can also be a 3D camera 22 operable to capture a three dimensional image. This will speed up the process even more.

The apparatus 10 also comprises a means 24 operable to evaluate the image or images so as to determine if each image describes at least one teat cup $40_1$, $40_2$, $40_3$, $40_4$ of a teat cup magazine 42.

As is apparent in FIG. 2, the means 24 is connected to the scanning head 16, and functions as a control unit, which also is adapted to control the operation of the light source 18 and the camera 22. Furthermore, the apparatus 10 also comprises a to the means 24 connected means 26 operable to determine the position of the at least one teat cup $40_1$, $40_2$, $40_3$, $40_4$ of a teat cup magazine 42, if it is established that the teat cup or cups $40_1$-$40_4$ is/are described by the image or images. As is apparent in FIG. 2, the apparatus 10 also comprises a detection means 210 connected to said means 24, which detection means 210 is operable to detect and identify a milking location 202 with the aid of an identification means 200 located at each milking location 202. The identification means 200 can e.g. be a bar code 200, and in that case, the detection means 210 is a bar code reader 210. The identification means 200 can also be an encoder 200 specific for each milking location, wherein the detection means 210 detects different codes from different encoders 200. This means that each milking location is identified by a code specific for the encoder 200 situated in the milking location. The encoder can make use of different technologies such as capacitive, inductive, eddy current, magnetic and optical.

Furthermore, the apparatus 10 also comprises a memory means 212 connected to said means 24, and operable to store the established position of the at least one teat cup $40_1$, $40_2$, $40_3$, $40_4$ and to relate it to said identification means 200. Furthermore, the apparatus 10 also comprises a fetch means 214 connected to said means 24, and operable to fetch at least one teat cup $40_1$, $40_2$, $40_3$, $40_4$ from the teat cup magazine 42 at the established position.

It is pointed out, that the scanning head 16, in its most general form, comprises a wave emitting source 18 for emitting waves 20, and in that the means 22 is operable to capture at least one image formed by the waves 20. The image can be a one, two or three dimensional image.

In another embodiment of the apparatus 10, the wave emitting source 18 is an ultrasonic source 18 operable to emit ultrasonic sound.

It is pointed out that the term image as it is used in this description can be provided by only one pixel or a number of pixels. An image formed by waves can relate for example to intensity, colour, or phase deviation of reflections of said waves.

The scanning head 16 is arranged to be moved to an initial position A' (see FIG. 3a) in the room, which position A' is well below the teat cup magazine 42 (see FIG. 3a) Thereafter, the scanning head 16 is arranged to be moved in a first 2: scanning mode (I), wherein the scanning head 16 simultaneously performs two movements. A first movement characterized by a linear movement upwards in a first direction (arrow B in FIG. 3a) towards the teat cup magazine 42, and a second movement in a first plane, perpendicular in relation to the first direction B, describing a geometrically closed pattern, whereby the scanning head 16 circumscribes a first volume (V1) (see FIG. 3a), while carrying out the scanning procedure. The apparatus 10 also comprises a means 32 operable to compare images obtained during the first scanning mode (I) with corresponding images obtained in previous moments during the first scanning mode (I) until the position of at least at least one teat cup $40_1$, $40_2$, $40_3$, $40_4$ of a teat cup magazine 42 has been established, or a predetermined time limit has elapsed during the scanning procedure. As is apparent in FIG. 2, the comparing means 32 is connected to the evaluation means/control unit 24 and the position determining means 26.

Figure 3B:
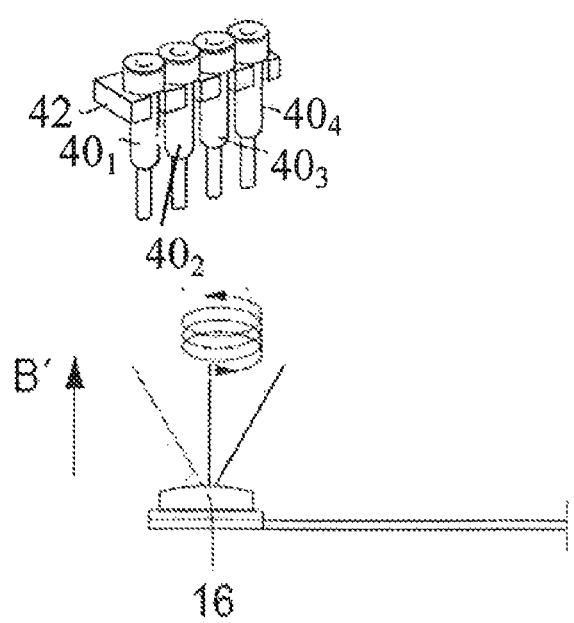

Thereafter, the scanning head 16 can be arranged to be moved in a second scanning mode (II), wherein the scanning head 16 simultaneously performs two movements. A first movement characterized by a linear movement upwards in a first direction (arrow B' in FIG. 3b) towards the teat cup magazine 42, and a second movement in a first plane, perpendicular in relation to the first direction B', describing a geometrically closed pattern, whereby the scanning head 16 circumscribes a second volume (V2) (see FIG. 3b), while carrying out the scanning procedure. It is pointed out that the second volume (V2) is smaller than the first volume (V1). Thereafter, the comparing means 32 is operable to compare images obtained during the second scanning mode (II) with corresponding images obtained in previous moments during the second scanning mode (II) until the position of at least a second teat cup $40_1$, $40_2$ has been established, or a predetermined time limit has elapsed during the scanning procedure. The predetermined time limit can e.g. be 3 minutes.

Further, as is apparent in FIG. 2, the evaluation means/control unit 24 controls the movement of the scanning head 16 by transmitting signals to a drive mechanism 8, which is arranged to move a robot arm 9, which in turn carries the scanning head 16.

In another embodiment of the apparatus 10, if the fetch means 214 (see FIG. 2) unsuccessfully has tried to fetch the at least one teat cup $40_1$, $40_2$, $40_3$, $40_4$ from the teat cup magazine 42 a predetermined number of times, the apparatus 10 is arranged to repeat the recognising and determining of the position of at least one teat cup $40_1$, $40_2$, $40_3$, $40_4$ of at least one teat cup magazine 42.

According to another embodiment of the apparatus 10, if the fetch means 214 (see FIG. 2) does not succeed in fetching the at least one teat cup $40_1$, $40_2$, $40_3$, $40_4$ from the teat cup magazine 42, the apparatus 10 is arranged to repeat the recognising and determining of the position of at least one teat cup $40_1$, $40_2$, $40_3$, $40_4$ of at least one teat cup magazine 42.

According to another embodiment of the apparatus 10, it is arranged to repeat the recognising and determining of the position of at least one teat cup $40_1$, $40_2$, $40_3$, $40_4$ of at least one teat cup magazine 42 in case of a shut-down or after service.

Figure 4:
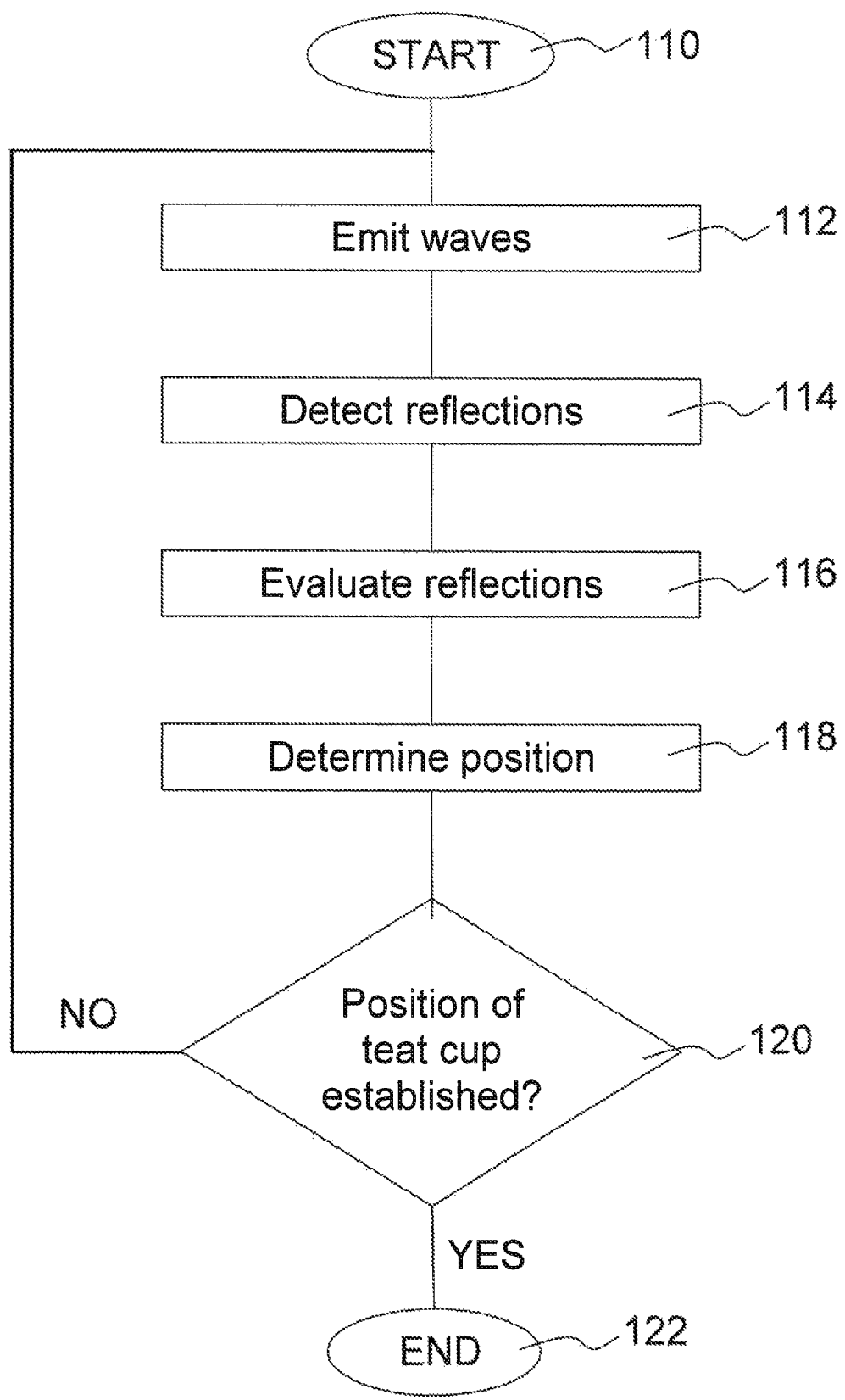
FIG. 4 is a flow chart of a first embodiment of a method for recognising and determining the position of at least one teat cup of a teat cup magazine according to the present invention.

In FIG. 4 there is disclosed a flow chart of a first embodiment of a method for recognising and determining the position of at least one teat cup $40_1$, $40_2$, $40_3$, $40_4$ of a teat cup magazine 42 according to the present invention. The method begins at block 110. Thereafter, the method continues, at block 1112 with the step: to emit waves 20 into a region (A') containing the at least one teat cup $40_1$, $40_2$, $40_3$, $40_4$ so as to direct the waves 20 towards the at least one teat cup $40_1$, $40_2$, $40_3$, $40_4$. The method continues, at block 114, with the step: to detect reflections of the waves 20. Thereafter, the method continues, at block 116, with the step: to evaluate the reflections so as to determine if the reflections originate from the at least one teat cup $40_1$, $40_2$, $40_3$, $40_4$. The method continues, at block 118, with the step: in the event that it is established that the reflections originate from the at least one teat cup $40_1$, $40_2$, $40_3$, $40_4$, to determine the position of the at least one teat cup $40_1$, $40_2$, $40_3$, $40_4$. Thereafter, the method continues, at block 120, with the step: to ask the question if the position of at least one teat cup $40_1$, $40_2$, $40_3$, $40_4$ has been established? If the answer is negative (NO), then the steps according to the blocks 112-120 are performed once again. If, on the other hand, the answer is affirmative (YES), then the method is completed at block 122.

In FIG. 5 there is disclosed a flow chart of the method for recognising and determining the position of at least one teat cup $40_1$, $40_2$, $40_3$, $40_4$ of a teat cup magazine 42, according to the present invention. The method begins at block 50. Thereafter, the method continues, at block 52, with the step; to move a scanning head 16 comprising wave emitting source 18 to a region (A) containing the at least one teat cup $40_1$, $40_2$, $40_3$, $40_4$ of a teat cup magazine 42. The method continues, at block 54, with the step: to emit waves 20 from the wave emitting source 18 into the region (A) so as to direct the waves 20 towards the at least one teat cup $40_1$, $40_2$, $40_3$, $40_4$ of a teat cup magazine 42. Thereafter, the method continues, at block 56, with the step: to move the scanning head 16 in a first scanning mode (I), wherein the scanning head 16 simultaneously performs two movements, a first movement characterized by a linear movement upwards in a first direction towards the at least one teat cup $40_1$, $40_2$, $40_3$, $40_4$ of a teat cup magazine 42 and a second movement in a first plane, perpendicular in relation to the first direction, describing a geometrically closed pattern, whereby the scanning head 16 circumscribes a first volume (V1), while carrying out the scanning procedure. The method continues, at block 58, with the step: to capture at least one image formed by the waves 20. Thereafter, the method continues, at block 60, with the step: to evaluate the image or images so as to determine if each image describes the at least one teat cup $40_1$, $40_2$, $40_3$, $40_4$ of a teat cup magazine 42. The method continues, at block 62, with the step: in the event that it is established that the at least one teat cup $40_1$, $40_2$, $40_3$, $40_4$ of a teat cup magazine 42 is/are described by the image or images, to determine the position of the at least one teat cup $40_1$, $40_2$, $40_3$, $40_4$ of a teat cup magazine 42. It is understood that the blocks 58-62 may be iterated. Thereafter, the method continues, at block 64, with the step: to ask the question if the position of at least one teat cup $40_1$, $40_2$, $40_3$, $40_4$ of a teat cup magazine 42 has been established? If the answer is negative (NO), then the steps according to the blocks 52-64 are performed once again. If on the other hand, the answer is affirmative, then the method continues, at block 66, with the step: to move the scanning head 16 in a second scanning mode (II), wherein the scanning head 16 simultaneously performs two movements, a first movement characterized by a linear movement upwards in a first direction towards the at least one teat cup $40_1$, $40_2$, $40_3$, $40_4$ of a teat cup magazine 42, and a second movement in a first plane, perpendicular in relation to the first direction, $2a$ describing a geometrically closed pattern, whereby the scanning head 16 circumscribes a second volume (V2), while carrying out the scanning procedure. The second volume (V2) is smaller than the first volume (V1). Thereafter, the method continues, at block 68, with the step: to capture at least one image formed by the waves 20. The method continues, at block 70, with the step: to evaluate the image or images so as to determine if each image describes the at least one teat cup $40_1$, $40_2$, $40_3$, $40_4$ of a teat cup magazine 42. Thereafter, the method continues, at block 72 with the step: in the event that it is established that the one teat cup $40_1$, $40_2$, $40_3$, $40_4$ of a teat cup magazine 42, is/are described by the image or images, to determine the position of the at least one teat cup $40_1$, $40_2$, $40_3$, $40_4$ of a teat cup magazine 42. The method continues, at block 74, with the step: to ask the question if the positions of all the teat cups $40_1$, $40_2$, $40_3$, $40_4$ have been established? or if a predetermined time limit has elapsed during the scanning procedure? If the answer is negative (NO), then the steps according to the blocks 66-74 are performed once again. If, on the other hand, the answer is affirmative, then the method is completed at block 76.

According to another embodiment of the method, it also comprises the steps:
   to emit waves 20 directed towards a known reference point 250 with a known position; and
   to make use of the known position when determining the position of the at least one teat cup $40_1$, $40_2$, $40_3$, $40_4$.

According to yet another preferred embodiment of the method, it also comprises the steps:
   with the aid of an identification means 200 located at each milking location 202, to identify each milking location 202; and to store the established position of the at least one teat cup $40_1$, $40_2$, $40_3$, $40_4$ and to relate it to the identification means 200.

The identification step can be performed with the aid of a visual detection means 204, or an inductive sensor 206. It is pointed out that the visual detection means 204 can preferably be in the form of the image-capturing camera 22 mentioned above.

According to another embodiment, said method also comprises the steps:
- to fetch at least one teat cup $40_1$ $40_2$, $40_3$, $40_4$ from said teat cup magazine 42 at said established position;
- if said fetch step turn out to be unsuccessful, to repeat said fetch step; and
- if said fetch step unsuccessfully has been performed a predetermined number of times, to repeat said method for recognizing and determining the position of at least one teat cup $40_1$ $40_2$, $40_3$, $40_4$ of at least one teat cup magazine 42.

According to another embodiment, said method also comprises the steps:
- to fetch at least one teat cup $40_1$ $40_2$, $40_3$, $40_4$ from said teat cup magazine 42 at said established position; and
- if said fetch step turn out to be unsuccessful, to repeat said method for recognizing and determining the position of at least one teat cup $40_1$ $40_2$, $40_3$, $40_4$ of at least one teat cup magazine 42.

According to another embodiment, said method also comprises the step:
- to repeat said method for recognizing and determining the position of at least one teat cup $40_1$ $40_2$, $40_3$, $40_4$ of at least one teat cup magazine 42 in case of a shut-down or after service.

It is pointed out that the milking parlour mentioned in this application can e.g. have a rotary parlour configuration, or a herringbone parlour configuration.

When the invention is realized in a rotary parlour configuration it is very important to detect the differences in position between the different milking locations, which in turn have influence on the position of the animal in relation to the arm of the robot means. The arm of the robot means which holds said camera means can make a movement and identify different points which will give the position of the milking location in relation to the origin of coordinates and the direction of axis.

Figure 6:
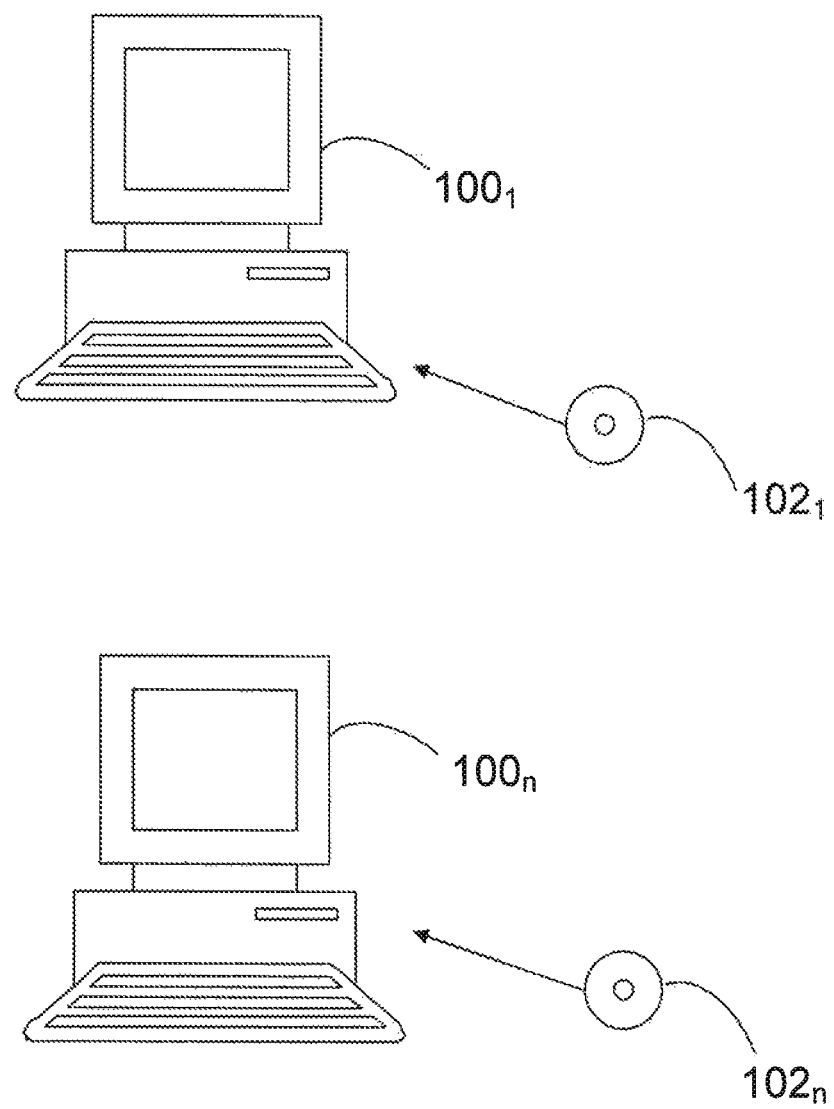
FIG. 6 schematically shows a number of computer program products according to the present invention.

In FIG. 6, some computer program products $102_1, \ldots, 102_n$ according to the present invention are schematically shown. In FIG. 6, n different digital computers $100_1, \ldots, 100_n$ are shown, where n is an integer. In FIG. 6, n different computer program products $102_1, \ldots, 102_n$ are shown, here shown in different form of CD discs. The different computer program products $102_1, \ldots, 102_n$ are directly loadable into the internal memory of the n different computers $100_1, \ldots, 100_n$. Each computer program product $102_1, \ldots, 102_n$ comprises software code portions for executing a part or all the steps according to FIG. 4, or FIG. 5, when the product/products $102_1, \ldots, 102_n$ is/are run on the computers $100_1, \ldots, 100_n$. The computer program products $102_1, \ldots, 102_n$ may, for instance, be in the form of diskettes, RAM discs, magnetic tapes, magneto-optical discs or some other suitable products.

The invention is not limited to the described embodiments. It will be evident for those skilled in the art that many different modifications are feasible within the scope of the following Claims.

The invention claimed is:

1. A method for recognizing and determining the position of at least one teat cup ($40_1$, $40_2$, $40_3$, $40_4$) of at least one teat cup magazine (42; $40_1$, $40_2$), characterized in that said method comprises the steps:
   - to emit waves (20) into a region (A) containing said at least one teat cup ($40_1$, $40_2$, $40_3$, $40_4$) so as to direct said waves (20) towards said at least on teat cup ($40_1$, $40_2$, $40_3$, $40_4$);
   - to detect reflections of said waves (20);
   - to evaluate said reflections so as to determine if said reflections originate from said at least one teat cup ($40_1$, $40_2$, $40_3$, $40_4$); and
   - in the event that it is established that said reflections originate from said at least one teat cup ($40_1$, $40_2$, $40_3$, $40_4$), to determine the position of said at least one teat cup ($40_1$, $40_2$, $40_3$, $40_4$), wherein said method is performed in a milking parlour with a rotary parlour configuration, or a herringbone parlour configuration.

2. A method according to claim 1, characterized in that said method also comprises the steps:
   - to emit waves (20) directed towards a known reference point (250) with a known position; and
   - to make use of said known position when determining the position of said least one teat cup ($40_1$, $40_2$, $40_3$, $40_4$).

3. A method according to claim 2, characterized in that said teat cup magazine ($42_1$, $42_2$) comprises a first teat cup magazine ($42_1$), and a second teat cup magazine ($42_2$), and in that said emitting step comprises to emit said waves (20) directed towards said first magazine ($42_1$) and said second magazine ($42_2$).

4. A method according to claim 1, characterized in that said emitting step is performed with the aid of a wave emitting source (18) comprised of a movable scanning head (16).

5. A method according to claim 4, characterized in that said method also comprises the steps:
   - to capture at least one image formed by said waves (20);
   - to evaluate said image or images so as to determine if each image describes said at least one teat cup ($40_1$, $40_2$, $40_3$, $40_4$); and
   - in the event that it is established that said at least one teat cup ($40_1$, $40_2$, $40_3$, $40_4$) is/are described by said image or images, to determine the position of said at least one teat cup ($40_1$, $40_2$, $40_3$, $40_4$).

6. A method according to claim 5, characterized in that said image is a three dimensional image.

7. A method according to claim 5, characterized in that said method comprises the steps:
   - to move said scanning head (16) to an initial position (A') in the room, which position (A') is well below and in front of said teat cup magazine (42);
   - to move said scanning head (16) in a predetermined pattern while carrying out the scanning procedure; and
   - wherein said evaluating step comprises to compare images obtained during said scanning procedure with corresponding images obtained in previous moments during said scanning procedure until the position of said at least one teat cup ($40_1$, $40_2$, $40_3$, $40_4$) has been established, or a predetermined time limit has elapsed during the scanning procedure.

8. A method according to claim 7, characterized in that said method also comprises the step:
   - to move said scanning head (16) in a first scanning mode (I), wherein said scanning head (16) simultaneously performs two movements, a first movement characterized by a linear movement upwards in a first direction towards said teat cup magazine (42), and a second movement in a first plane, perpendicular in relation to said first direction, describing a geometrically closed pattern, whereby said scanning head (16) circumscribes a first volume (V1), while carrying out the scanning procedure, said evaluating step comprising to compare images obtained during said first scanning mode (I) with corresponding images obtained in previous moments during said first scanning mode (I) until the position of said at lest one teat cup ($40_1$, $40_2$, $40_3$, $40_4$) has been established, or a predetermined time limit has elapsed during the scanning procedure.

9. A method according to claim 8, characterized in that said method also comprises the step:
to move said scanning head (16) in a second scanning mode (II), wherein said scanning head (16) simultaneously performs two movements, a first movement characterized by a linear movement upwards in a first direction towards said teat cup magazine (42), and a second movement in a first plane, perpendicular in relation to said first direction, describing a geometrically closed pattern, whereby said scanning head (16) circumscribes a second volume (V2), while carrying out the scanning procedure, wherein said second volume (V2) is smaller than said first volume (V1), wherein said evaluating step comparing to compare images obtained during said second scanning mode (II) with corresponding image obtained in previous moments during said second scanning mode (II) until the position of at least a second teat cup ($40_1$, $40_2$, $40_3$, $40_4$) has been established, or a predetermined time limit has elapsed during the scanning procedure.

10. A method according to claim 1, characterized in that said method also comprises the steps:
with the aid of an identification means (200) located at each milking location (202), to identify each milking location (202); and
to store said established position of said at least one teat cup ($40_1$, $40_2$, $40_3$, $40_4$) and to relate said established position to said identification means (200).

11. A method according to claim 10, characterized in that said identification step is performed with the aid of a visual detections means (204), or an inductive sensor (206).

12. A method according to claim 1, characterized in that said method also comprises the steps:
to fetch at least one teat cup ($40_1$, $40_2$, $40_3$, $40_4$) from said teat cup magazine (42) at said established position;
if said fetch step turn out to be unsuccessful, to repeat said fetch step; and
if said fetch step unsuccessfully has been performed a predetermined number of times, to repeat said method for recognizing and determining the position of at least one teat cup ($40_1$, $40_2$, $40_3$, $40_4$) of at least one teat cup magazine (42).

13. A method according to claim 1, characterized in that said method also comprises the steps:
to fetch at least one teat cup ($40_1$, $40_2$, $40_3$, $40_4$) from said teat cup magazine (42) at said established position; and
if said fetch step turn out to be unsuccessful, to repeat said method for recognizing and determining the position of at least one teat cup ($40_1$, $40_2$, $40_3$, $40_4$) of at least one teat cup magazine (42).

14. A method according to claim 1, characterized in that said method also comprises the step:
to repeat said method for recognizing and determining the position of at least one teat cup ($40_1$, $40_2$, $40_3$, $40_4$) of at least one teat cup magazine (42) in case of a shut-down or after service.

15. An apparatus (10) for recognizing and determining the position of at least one teat cup ($40_1$, $40_2$, $40_3$, $40_4$) of at least one teat cup magazine (42; $42_1$, $42_2$) in a milking parlour with a rotary parlour configuration, or a herringbone parlour configuration, wherein said apparatus (10) is operable to emit waves (20) into a region (A) which is expected to contain said at least one teat cup ($40_1$, $40_2$, $40_3$, $40_4$);
a detection means (260) operable to detect reflections of said waves (20);
a means (24) operable to evaluate said reflections so as to determine if said reflections originate from said at least one teat cup ($40_1$, $40_2$, $40_3$, $40_4$); and
means (26) operable to determine the position of said at least one teat cup ($40_1$, $40_2$, $40_3$, $40_4$) if it is established that said reflections originate from said teat cup ($40_1$, $40_2$, $40_3$, $40_4$).

16. An apparatus (10) according to claim 15, characterized in that said apparatus (10) also comprises a wave emitting source (18) which is operable to emit waves (20) directed towards a known reference point (250) with a known position, and in that said means (26) also is operable to make use of said known position when determining the position of said at least one teat cup ($40_1$, $40_2$, $40_3$, $40_4$).

17. An apparatus (10) according to claim 16, characterized in that said teat cup magazine ($42_1$, $42_2$) comprises a first teat cup magazine ($42_1$), and a second teat cup magazine ($42_2$), and in that said wave emitting source (18) is operable to emit said waves (20) directed towards said first magazine ($42_1$) and said second magazine ($42_2$).

18. An apparatus (10) according to claim 16, characterized in that said apparatus (10) also comprises a movable scanning head (16), wherein said wave emitting source (16) is comprised in said scanning head (16).

19. An apparatus (10) according to claim 18, characterized in that said apparatus (10) also comprises:
a means (22) operable to capture at least one image formed by said wave (20);
said means (24) is also operable to evaluate said image or images so as to determine if each image describes said at least one teat cup ($40_1$, $40_2$, $40_3$, $40_4$); and
said means (26) is also operable to determine the position of said at least one teat cup ($40_1$, $40_2$, $40_3$, $40_4$) if it is established that said teat cup or teat cups ($40_1$, $40_2$, $40_3$, $40_4$) is/are described by said image or images.

20. An apparatus (10) according to claim 19, characterized in that said means (22) is operable to capture at least one three dimensional image.

21. An apparatus (10) according to claim 19, characterized in that
said scanning head (16) is arranged to be moved to an initial position (A') in the room, which position (A') is well below and in front of said teat cup magazine (42); and
said scanning head (16) is arranged to be moved in a predetermined pattern while carrying out the scanning procedure, wherein means (32) are arranged for comparing images obtained during said scanning procedure with corresponding images obtained in previous moments during said scanning procedure until the position of said at least one teat cup ($40_1$, $40_2$, $40_3$, $40_4$) has been established, or a predetermined time limit has elapsed during the scanning procedure.

22. An apparatus (10) according to claim 21, characterized in that said scanning head (16) is arranged to be moved in a first scanning mode (I), wherein said scanning head (16) simultaneously performs two movements, a first movement characterized by a linear movement upwards in a first direction toward said teat cup magazine (42), and a second movement in a first plane, perpendicular in relation to said first direction, describing a geometrically closed pattern, whereby said scanning head (16) circumscribes a first volume (V1), while carrying out the scanning procedure, wherein said moans (32) are arranged for comparing images obtained during said first scanning mode (I) with corresponding images obtained in previous moments during said first scanning mode (I) until the position of said at least one teat cup (40$_1$, 40$_2$, 40$_3$, 40$_4$) has been established, or predetermined time limit has elapsed during the scanning procedure.

23. An apparatus (10) according to claim 22, characterized in that said scanning head (16) is arranged to be moved in a second scanning mode (II), wherein said scanning head (16) simultaneously performs two movements, a first movement characterized by a linear movement upwards in a first direction towards said teat cup magazine (42), and a second movement in a first plane, perpendicular in relation to said first direction, describing a geometrically closed pattern, whereby said scanning head (16) circumscribes a second volume (V2), while carrying out the scanning procedure, wherein said second volume (V2) is smaller than said first volume (V1), wherein said means (32) are arranged for comparing images obtained during said second scanning mode (II) with corresponding images obtained in previous moments during said second scanning mode (II) until the position of at least a second teat cup (40$_1$, 40$_2$, 40$_3$, 40$_4$) has been established, or a predetermined time limit has elapsed during the scanning procedure.

24. An apparatus (10) according to claim 15, characterized in that said apparatus (10) also comprises a detection means (210) operable to detect and identify a milking location (202) with the aid of an identification means (200) located at each milking location (202), and in that said apparatus (10) also comprises a memory means (212) operable to store said established position of said at least one teat cup (40$_1$, 40$_2$, 40$_3$, 40$_4$) and to relate said established position to said identification means (200).

25. An apparatus (10) according to claim 24, characterized in that said detection means (210) is in the form of a visual detection means (204), or an inductive sensor (206).

26. An apparatus (10) according to claim 15, characterized in that said apparatus (10) also comprises a fetch means (214) operable to fetch at least one teat cup (40$_1$, 40$_2$, 40$_3$, 40$_4$) from said teat cup magazine (42), at said established position, and in that said apparatus (10) is arranged, if said fetch means (214) unsuccessfully has tried to fetch said at least one teat cup (40$_1$, 40$_2$, 40$_3$, 40$_4$) from said teat cup magazine (42) a predetermined number of times, to repeat said recognizing and determining of the position of at least one teat cup (40$_1$, 40$_2$, 40$_3$, 40$_4$) of at least one teat cup magazine (42).

27. An apparatus (10) according to claim 15, characterized in that said apparatus (10) also comprises a fetch means (214) operable to fetch at least one teat cup (40$_1$, 40$_2$, 40$_3$, 40$_4$) from said teat cup magazine (42) at said established position, and in that said apparatus (10) is arranged, if said fetch means (214) does not succeed in fetching said at least one teat cup (40$_1$, 40$_2$, 40$_3$, 40$_4$) from said teat cup magazine (42) to repeat said recognizing and determining of the position of at least one teat cup (40$_1$, 40$_2$, 40$_3$, 40$_4$) of at least one teat cup magazine (42).

28. An apparatus (10) according to claim 15, characterized in that said apparatus (10) is arranged to repeat said recognizing and determining of the position of at least one teat cup (40$_1$, 40$_2$, 40$_3$, 40$_4$) of at least one teat cup magazine (42) in case of a shut-down of after service.

29. At least one computer program product (102$_1$, . . . , 102$_n$) directly loadable into the internal memory of at least one digital computer (100$_1$, . . . , 100$_n$), comprising software code portions for performing the steps of claim 1 when said at least one product (102$_1$, . . . , 102$_n$) is/are run on said at least one computer (100$_1$, . . . , 100$_n$).

\* \* \* \* \*